H. C. McMILLAN.
HORSE COLLAR.
APPLICATION FILED JAN. 19, 1910.
1,012,685.
Patented Dec. 26, 1911.
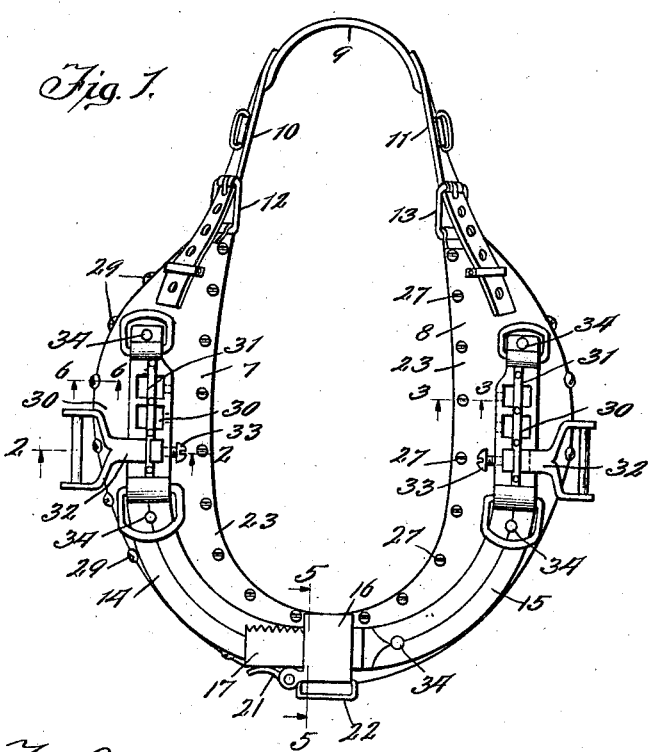
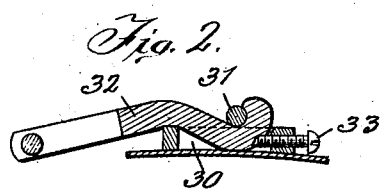
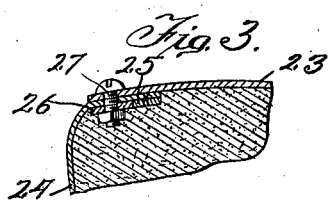
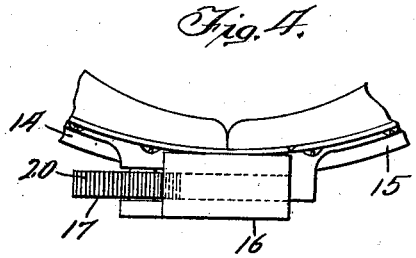
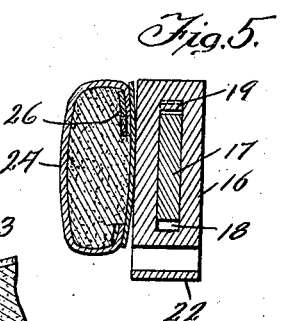
Witnesses.
Inventor
Hugh C. McMillan,
By Bond Adams Pickard Jackson,
Atty's

UNITED STATES PATENT OFFICE.

HUGH C. McMILLAN, OF SAVANNA, ILLINOIS.

HORSE-COLLAR.

1,012,685.  Specification of Letters Patent.  Patented Dec. 26, 1911.

Application filed January 19, 1910. Serial No. 538,846.

*To all whom it may concern:*

Be it known that I, HUGH C. MCMILLAN, a citizen of the United States, residing at Savanna, in the county of Carroll and State of Illinois, have invented certain new and useful Improvements in Horse-Collars, of which the following is a specification, reference being had to the accompanying drawings.

My invention relates to horse collars, and has for its object to provide a substantial and efficient combined horse-collar and hames which will be inexpensive in construction and which will embody certain improvements which will be hereinafter more particularly pointed out, such improvements relating principally to devices for securing the separable lower end portions of the collar together so that they may be easily and quickly connected or disconnected, and to the construction by which the edges of the materials composing the collar are united. I accomplish this object as illustrated in the drawings and as hereinafter described.

That which I believe to be new is set forth in the claims.

In the accompanying drawings,—Figure 1 is a front view of my improved collar; Fig. 2 is a partial cross-section on line 2—2 of Fig. 1, showing the devices for adjustably securing the tugs to the collar; Fig. 3 is a cross-section on line 3—3 of Fig. 1, showing the construction employed for securing together the edges of the materials composing the collar; Fig. 4 is a plan view of the lower portion of the collar; Fig. 5 is a cross-section on line 5—5 of Fig. 1, and Fig. 6 is a cross-section on line 6—6 of Fig. 1.

Referring to the drawings,—as best shown in Fig. 1, the collar is composed of two members 7—8, in the nature of pads or cushions which fit at opposite sides of the animal's neck and are adapted to be secured together at their lower ends by suitable devices which will be hereinafter described, their upper ends being connected by a band 9, preferably of leather, having at its ends straps 10—11 which are connected by buckles 12—13, respectively, with the upper ends of the members 7—8. By adjusting the straps 10—11 and their respective buckles the size of the collar may be adjusted to fit the animal's neck. 14—15 indicate curved hame-bars, preferably of iron or steel, which are fixedly secured to the member, 7—8 and which have an interlocking connection at their lower ends to unite the lower ends of the collar, as best shown in Figs. 1, 4 and 5. The hame-bar 14 is provided at its lower end with a sleeve 16, which is adapted to receive a tongue 17 which projects from the lower end of the hame-bar 15. The passage 18 through the sleeve 16 is slightly wider vertically than the vertical width of the tongue 17, and it is provided at its upper margin with a downwardly projecting lug or tooth 19 which is adapted to engage serrations 20 on the upper surface of the tongue 17, as best shown in Figs. 1 and 5. The tongue 17, when in operative position, is pressed up, so as to cause the serrations 20 to engage the tooth 19, by a cam-lever 21 pivotally secured to the lower portion of the sleeve 16 and bearing against the edge of the tongue 17, as shown in Fig. 1. By turning down the lever 21, the tongue 17 may be released and may then be dropped down to disengage the tooth 19 and permit its withdrawal from the sleeve 16. By this construction the lower ends of the collar may be very firmly secured together, but may be quickly released when desired.

22 indicates a loop carried by the sleeve 16 for securing the breast strap to the collar.

The members 7—8 are substantially of the usual shape, and they are made up of metal face-plates 23, to which the hame-members 14—15 are secured, and leather casings 24, the edges of which are secured to the face-plates 23. In Fig. 3 I have shown the construction employed for securing the inner margins of the casing 24 to the face-plate 23, the edge of the casing being extended under the inner edge of the face-plate and having secured to it a leather strip 25 which extends longitudinally thereof on its under side. A metal strip 26 is fitted against the under surface of the casing adjacent to the strip 25 so that the strip 25 forms a rib which prevents the edge of the casing from pulling out when the metal strip 26 is secured in place. Said strip 26 is secured to the face-plate 23 by bolts 27 placed at suitable intervals, said bolts passing through the face-plate, the edge of the casing, and the strip 26, as shown in Fig. 3.

In Fig. 6 I have shown the manner of securing the outer edge of the casing to the face-plate, in this case the edge of the casing being fitted between the edge of the face-plate and a metal strip 28 secured to the casing by bolts 29. The casing is filled with suitable stuffing material to form a pad in the usual way.

As best shown in Fig. 1, each of the hame-members 14—15 is provided at its upper end with a plurality of sockets 30 arranged at different heights on the collar, over which sockets extends a rod 31 extending longitudinally of the upper portion of the hame-member and fixedly secured thereto. The sockets 30 and rod 31 are employed to receive and retain tug-hooks 32, as shown in Figs. 1 and 2. As therein shown, the hooks 32 are bent so that their hooked ends are adapted to fit in the sockets 30 and engage the rod 31. When in such position, they may be fixedly secured in place by set-screws 33 screw-threaded in the hame-members, as shown in Fig. 2. Obviously, by loosening the set-screw 33 the hook 32 may be adjusted vertically by fitting it in one or the other of the sockets provided to receive it, thus providing for adjusting the position of the tugs with reference to their connection to the collar to accommodate horses of different heights. The hame-members are fixedly secured to the face-plates 23 preferably by rivets 34, as shown in Fig. 1.

That which I claim as my invention, and desire to secure by Letters Patent, is,—

1. A combined horse-collar and hames, comprising side-members, means connecting the upper ends of said side-members together, each of said side-members having a face-plate and a casing, one edge of said casing having a marginal strip secured to the inner face thereof, a retaining strip fitted against the inner surface of said casing adjacent to said marginal strip and secured to the face-plate, hame-members secured to said face-plates, and means for connecting the lower ends of said hame-members together.

2. A combined horse-collar and hames, comprising side-members, means connecting the upper ends of said side-members together, each of said side-members having a face-plate and a casing, one edge of said casing having a marginal strip secured to the inner face thereof, a retaining strip fitted against the inner surface of said casing adjacent to said marginal strip, bolts extending through the face-plate, the casing, and the retaining strip for securing said casing to the face-plate, hame-members secured to said face-plates, and means for connecting the lower ends of said hame-members together.

HUGH C. McMILLAN.

Witnesses:
JOHN L. JACKSON,
W. H. DE BUSK.